United States Patent [19]
Lehureau et al.

[11] 4,025,784
[45] May 24, 1977

[54] DEVICE FOR DETECTING FOCUSSING ERROR IN AN OPTICAL READER HEAD

[75] Inventors: Jean-Claude Lehureau; Claude Bricot, both of Paris, France

[73] Assignee: Thomson-Brandt, Paris, France

[22] Filed: July 22, 1975

[21] Appl. No.: 598,164

[30] Foreign Application Priority Data
July 26, 1974 France .............................. 74.26062

[52] U.S. Cl. ..................... 250/201; 179/100.3 V; 250/204; 358/127
[51] Int. Cl.² ........................................... G01J 1/20
[58] Field of Search .......... 250/201, 202, 570, 204; 179/100.3 V, 100.3 G, 100.3 E; 178/6.7 A, 6.6 R, 6.6 DD

[56] References Cited
UNITED STATES PATENTS

| | | | |
|---|---|---|---|
| 3,876,841 | 4/1975 | Kramer et al. | 179/100.3 V |
| 3,913,076 | 10/1975 | Lehureau et al. | 250/202 |
| 3,924,063 | 12/1975 | Simons | 178/6.7 A |
| 3,925,603 | 12/1975 | Naruse et al. | 250/201 |
| 3,932,700 | 1/1976 | Snopko | 178/6.6 R |

*Primary Examiner*—David C. Nelms
*Attorney, Agent, or Firm*—Cushman, Darby & Cushman

[57] ABSTRACT

A device for detecting the error in focussing a read-out beam on the impression. Two photodetector cells located respectively in front of and behind the optical axis of the system, in relation to the direction of transfer, produce two electrical signals the difference between which is the read-out signal, a control signal being obtained by a comparison of the phases of the two signals, one of which is phase-shifted so that the optimum focussing point corresponds to zero phase-shift.

7 Claims, 10 Drawing Figures

DEVICE FOR DETECTING FOCUSSING ERROR IN AN OPTICAL READER HEAD

The present invention relates to optical read-out of information recorded in the form of a track carried by a data carrier, and made to pass in front of an optical reader head. It relates more particularly to a device for detecting errors in the focussing of a light beam coming from the reader head and concentrated on the track in order to illuminate the same in the form of a spot of very small dimensions.

The optical read-out of the recorded information involves the problem of highly accurate focussing of the read-out light beam, on the data carrier.

It is well known to make the displacement of an element belonging to the optical device with which the displacement of the focussing point is associated, according to a control signal which translates the error in the distance between the focussing point of the read-out beam and the data carrier surface containing the track which is to be read out.

To produce this kind of control signal, the known devices generally utilise part of the read-out beam which is reflected by the data carrier surface containing the information. The reflected beam is processed by photo-electric detection devices which produce an error signal if the focussing point is no longer located on the data carrier due to a variation in the distance of the reader head from that surface of the data carrier which is to be read out.

The drawback of these devices is that they require the addition of optical devices such as semi-transparent plates, objective lenses, photo detector cells. Moreover, these devices cannot be used if, for reasons of protection, the impression constituting information is engraved inside the material.

The object of the present invention is a device which makes it possible to overcome the aforesaid drawbacks. According to the invention, there is provided a device for detecting the focussing error in an optical reader head designed to read-out a diffractive track recorded on a moving data carrier, said reader head comprising a radiation source, an optical device for projecting a read-out spot onto said track, means for detecting the emergent radiation, emerging from said track, which comprise at least two photodetector cells having respective outputs located in a plane perpendicular to the optical axis of said emergent radiation along the projection of said track onto said plane, said cells being disposed symmetrically in relation to said optical axis, each delivering an output signal, and further means having two inputs for measuring the time-shift between said output signals of said cells, said inputs of said further means being coupled to said outputs of the cells by a coupling device, said further means having an output for delivering a control signal characteristic of said focussing error.

The invention will be better understood from a consideration of the ensuing description, in reference to the attached drawings wherein.

Figure 1:
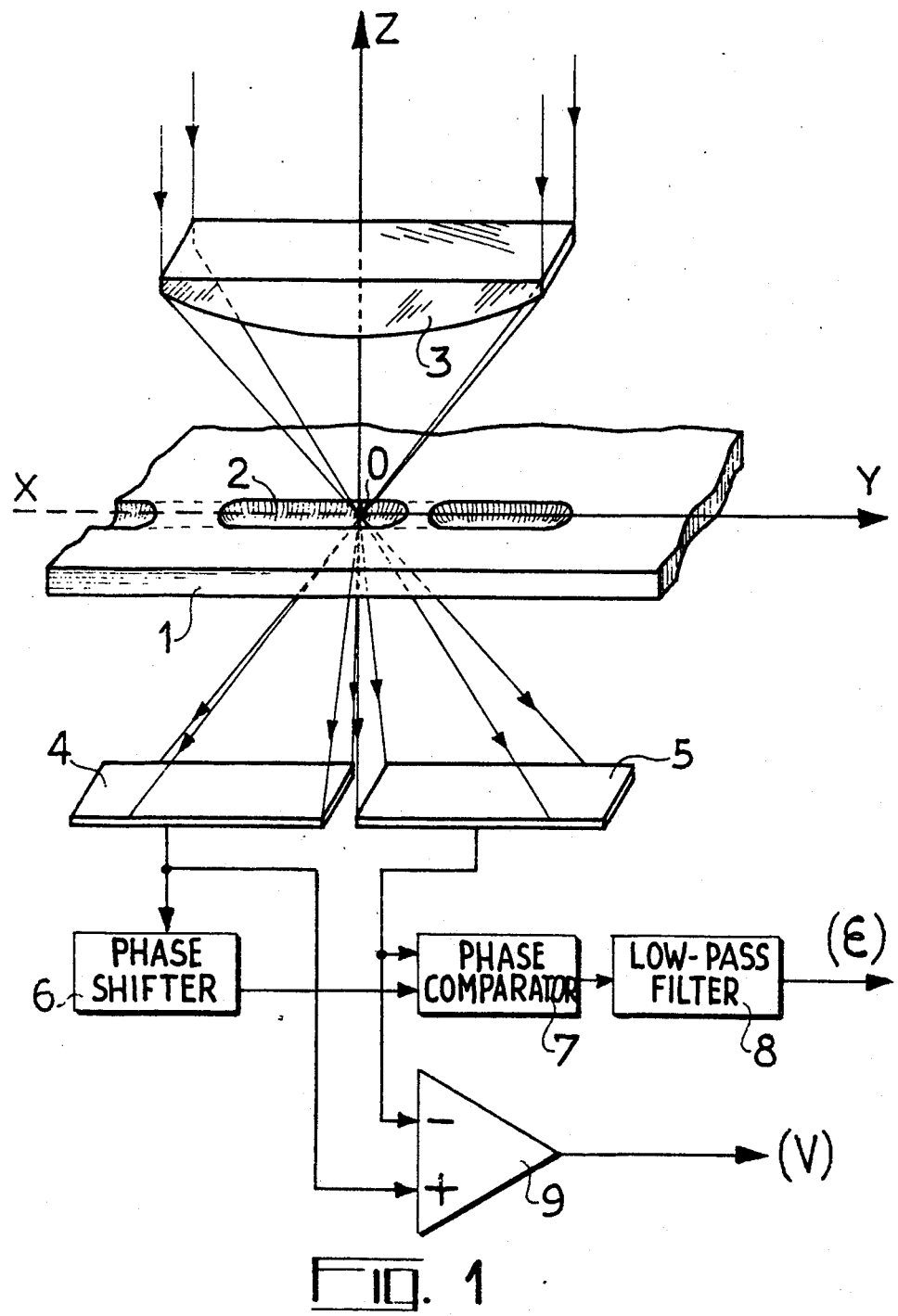
FIG. 1 illustrates an embodiment of the device in accordance with the invention, read-out being effected by transmission.

In FIG. 1, a data carrier 1 comprises, in the form of a track at its read-out surface a succession of diffractive elements such as that 2, constituting an impression. A lens 3 belonging to a reader head focusses a read-out beam at a point O in the neighbourhood of the data carrier, in order to form a read-out spot which locally illuminates the track carried by the data carrier; the optical axis OZ of the lens 3 will for example be perpendicular to the data carrier surface containing the impression. Two photodetector cells 4 and 5, also belonging to the read-out head, are arranged in a plane parallel to the surface carrying the impression. These two cells are aligned in the direction XY of transfer of the data carrier and are disposed at either side of the optical axis OZ of the system. The cell 4 is connected to the input of a phase shifter 6. The output of this circuit and the cell 5 are connected to the two inputs of a phase comparator 7 whose output is connected to the input of a low-pass filter 8. The reader head also comprises a differential amplifier 9 whose "−" input is connected to the output of the cell 5 while its "+" input is connected to the output of the cell 4. The output of the amplifier 9 furnishes a read-out signal (V) made up of positive and negative pulses. In other words, spatial variations in the illumination of the two photodetector cells take place at the instants at which the read-out spot passes over a slope in the impression, between a pit and a land and vice-versa. It is these spatial variations in the illumination of the cells which are responsible for the read-out signal.

However, independently of these variations in amplitude (they are simultaneous but of different magnitude) there are variations in amplitude which are translated by the two cells in the form of alternating signals exhibiting a certain phase-shift in relation to one another. This phase-shift is a function of the distance between the focussing point O of the read-out beam and the point of read-out M on the data carrier referred to hereinafter as the focussing error. However, in the absence of any defocussing, there is a residual phase-shift as well. This residual phase-shift is corrected by the circuit 6. The output signal ($\epsilon$) from the low-pass filter 8 is then characteristic of the variation in the distance, along the axis OZ, of the focussing point of the read-out spot from that surface of the data carrier 1 carrying the impression. Experience shows that the residual phase-shift is a function of the depth (along the axis OZ) of the impression carried by the carrier when the latter can be likened to a phase object.

A simple interpretation of the phenomenon of variation in the phase between the electrical output signals from the photodetector cells 4 and 5 as a function of the focussing error, can be given considering simply the zero order beam, that is to say the beam transmitted across the data carrier without diffraction.

In effect, it can be assumed that a displacement involving the moving away of the focussing point, gives rise to pseudo images of the impression in the detection planes of the cells.

Figure 2:
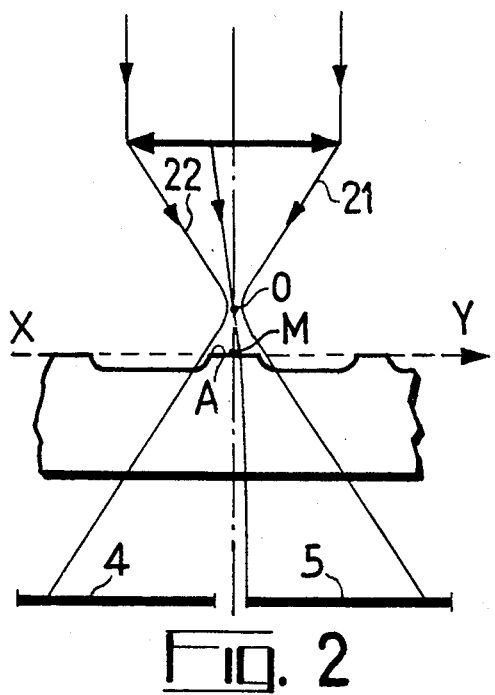
FIGS. 2 and 3 illustrate in section the device of FIG. 1 when the focussing point is respectively too high and too low in relation to the data carrier.
Figure 3:
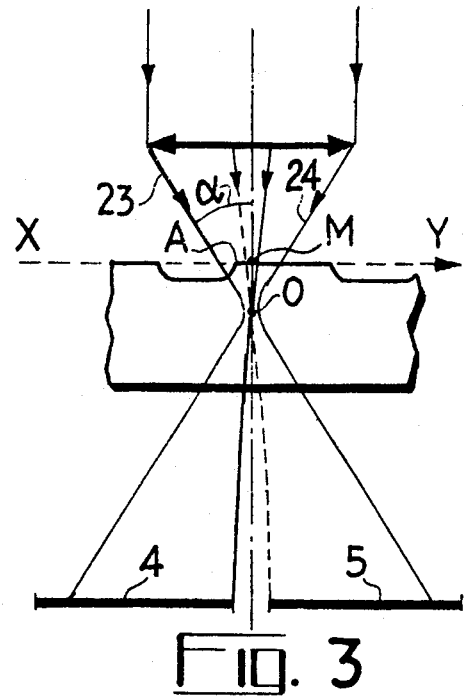

FIGS. 2 and 3 illustrate a section through the device shown in FIG. 1, in a situation where the focussing point is respectively too high and too low relatively to the position of the impression. In these figures, the elements also shown in FIG. 1 carry the same references.

Read-out by the beam of a point M in the impression which yields identical illumination of the two photodetector cells 4 and 5 when the beam is focussed at M (M not being a slope), on the other hand yields differing illumination of the two cells if the beam is focussed at a point O other than M.

Figure 4:
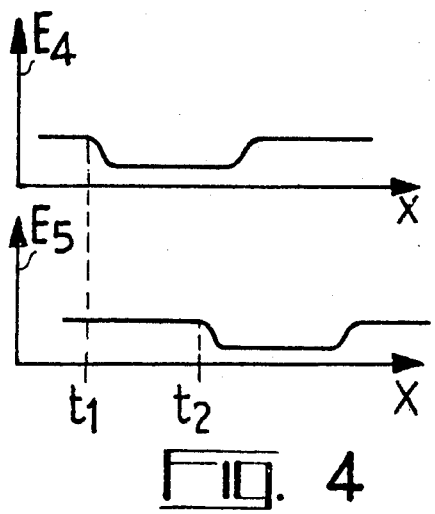
FIGS. 4 and 5 are explanatory diagrams.
Figure 5:
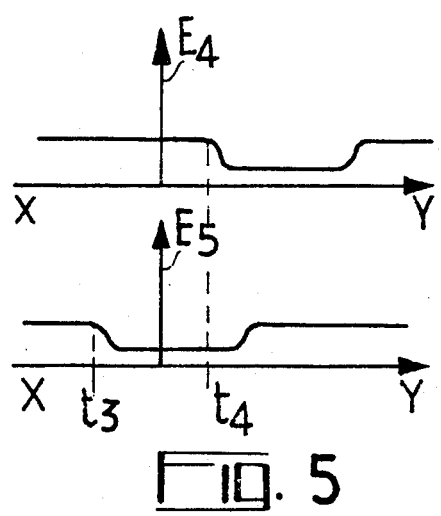

The curves characterising the variations in the illumination received by the photodetector cells 4 and 5 as a function of time, have been shown in FIGS. 4 and 5 respectively for the cases where the focussing point is too high and too low relatively to the position of the data carrier.

In other words, a slope such as A at the surface of the data carrier, will produce a variation in illumination if the focussing point is too high, first of all at the photodetector cell 4 and subsequently at the cell 5 after a delay T, where T is the duration separating the instant $t_1$ at which the limiting ray 21 of the read-out beam reaches the slope A, and the instant $t_2$ at which the limiting ray 22 reaches the same slope A, as the data carrier passes in the direction XY.

Conversely, if the focussing point is too low relatively to the impression, it is the time separating the instant $t_3$ at which the limiting ray 23 of the beam reaches the slope A and the instant $t_4$ at which the limiting ray 24 reaches said same slope A, which determines the delay T, the photodetector cell 5 recording variations in illumination due to the presence of slope, before the photo-detector cell 4.

The electrical signals characteristic of the illumination received by the photo-detector cells 4 and 5, are therefore delayed by a time T which is a function of the apertural angle $\alpha$ of the read-out beam, of the speed of transfer $v$ of the data carrier and of the focussing error $\epsilon$.

Figure 6:
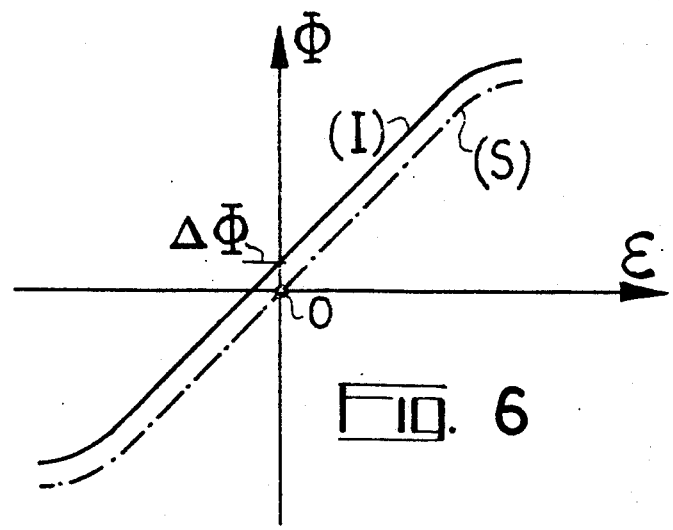
FIG. 6 illustrates a graph characteristic of the device.

This delay T corresponds, as far as the frequency carrying the information recorded upon the data carrier is concerned, to a phase-shift. This phase-shift between the two signals is therefore substantially proportional to the focussing error $\epsilon$ ($\alpha$ and $v$ being parameters characteristic of the device). It has been illustrated as a functon of $\epsilon$ by the graph (I) in FIG. 6. It will be seen from FIG. 6 that thre is a residual phase-shift $\Delta\Phi$ for a focussing error $\epsilon$ of zero.

The phenomenon of phase-shift can be explained in the following way:

the data carrier can be considered as a phase object which introduces a spatial phase variation of cosinusoidal form. The law of variation of phase produced by the impression as it displaces, can therefore be put in the form:

$$f(x, t) = e^{i \phi \cos(\nu x - \omega t)}$$

where $\nu$ is the spatial frequency of the phase object, $x$ the position of a point in the impression, $\omega$ the carrier frequency of the read-out signal (taking into account the speed of of transfer of the data carrier) and $\phi o$ the amplitude of the phase variation. For an incident illumination of the data carrier with a flat wave of complex amplitude equal to 1, the illumination $E_s$ which emerges from the data carrier, assuming that the latter is not absorbant, will be given by:

$$E_s = 1 \cdot e^{i \phi \cos(\nu x - \omega t)}$$

the term 1 representing uniform illumination of the data carrier by the incident wave. Breaking this down into a series and confining the development to the first term for small values of $\phi o$ we obtain for the emergent radiation:

$$E_s = 1 + i \phi o \cos(\nu x - \omega t) \quad (1)$$

Figure 7:
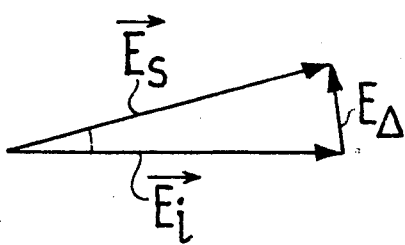
FIGS. 7 and 8 are explanatory vector diagrams.
Figure 8:
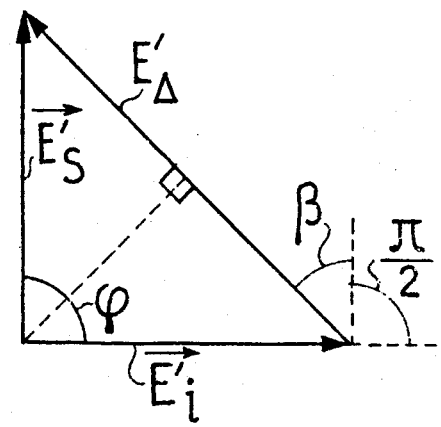

It is possible to represent the terms of this complex expression on a Fresnel diagram. This is what has been done in FIG. 7. The complex amplitude of the emergent illumination $E_s$ has been represented by a vector $\vec{E_s}$ equal to the sum of a vector $\vec{E_i}$ corresponding to the incident illumination $E_i$, and a vector $\vec{E_\Delta}$ corresponding to a phase rotation of around $\pi/2$, the amplitude of $\vec{E_\Delta} : \phi o \cos(\nu x - \omega t)$ is equal to the the angle between $\vec{E_i}$ and $\vec{E_s}$ (putting the sine as equal to the angle). By analogy with this representation, and for a phase-shift amplitude $\phi o$ which is not small, it is possible to represent the emergent illumination $E_s$ in the form of a vector $\vec{E_s}$ equal to the sum of the vector $\vec{E_i}$ associated with the incident radiation, and a vector $\vec{E_\Delta}$ whose phase in relation to the vector $\vec{E_i}$ is $(\pi/2 + \beta)$ and the amplitude $\alpha$. This what has been done in FIG. 8.

The formula (1) could be written as follows for large values of $\phi o$:

$$E_s = 1 + \alpha e^{i\left(\beta + \frac{\pi}{2}\right)}$$

The amplitude $\alpha$ is associated with the instantaneous phase-shift $\phi = \phi o \cos(\nu x - \omega t)$ by the relationship $\alpha = 2 \sin \phi$.

The phase-shift $\beta$ is associated with the instantaneous phase-shift by the relationship $\beta = \phi/2$.

If we limit the expression for $E_s$ simply to the fundamental terms of radian frequency $\omega$, then it becomes:

$$E_s = 1 + 4 j_1(\phi o) \cos(\nu x - \omega t) e^{i\left(\beta + \frac{\pi}{2}\right)}$$

$J_1(\phi o)$ being the first order Bessel function, of argument $\phi o$.

In fact, the illumination received by the impression is not constituted by a flat wave but by a spot centred on the axis OZ.

The illumination leaving the data carrier can therefore be written:

$$\delta(o) + k e^{i\left(\beta + \frac{\pi}{2}\right)} \left[ e^{-i\omega t} \delta\left(\frac{1}{\nu}\right) + e^{+i\omega t} - \delta\left(-\frac{1}{\nu}\right) \right]$$

$\delta(a)$ representing the focal spot produced by the objective lens illuminating the data carrier at the abscisse point a, and $k = 2 J_1(\phi o)$.

The illumination of the cells therefore appears to stem from a beam of origin O symmetrical in relation to OZ ($\delta(o)$), and from two lateral beams of origins $$-\frac{1}{\nu} \text{ and } +\frac{1}{\nu}$$

$$\left[\delta\left(\frac{1}{\nu}\right) \text{ and } \delta\left(-\frac{1}{\nu}\right)\right].$$

The illumination received in the plane of the cells is the Fourier transform of the illumination emerging from the data carrier. If we assume that the photo-detector cell 4 (located behind the optical axis) received a fraction of the zero order illumination and the beam of origin $$-\frac{1}{\nu},$$

and that the photo-detector cell 5 (located in front of the optical axis) receives a fraction of the zero order illumination and the beam of origin $$+\frac{1}{\nu},$$

then the incident illumination of the cell 4 will be proportional to:

$$S_4 = \left[\frac{1}{2} + k\, e^{i\left(\beta + \frac{\pi}{2}\right)} e^{i\omega t}\right]^2$$

and the illumination on the cell 5 will be proportional to:

$$S_5 = \left[-\frac{1}{2} + k\, e^{i\left(\beta + \frac{\pi}{2}\right)} e^{-i\omega t}\right]^2$$

Calculation of the signals furnished by the cells in square-law operation, illustrates that the phase-shift $\Delta\Phi$ between these two signals is $$\Delta\Phi : 2\left(\beta + \frac{\pi}{2}\right)$$

or $\Delta\Phi = \phi + \pi$

By way of example, for an impression depth of 3000 A, the wavelength of the read-out signal being around 6000 A, experience shows that the fixed phase-shift introduced by the depth variations for a material of refractive index 1.5, is $5\pi/4$.

In other words, the amplitude $\phi_0$ of the phase variation of the impression, is $$\frac{\pi}{4} \cdot \Delta\Phi = \frac{\pi}{4} + \pi.$$

The circuit 6 arranged at the output of the photodetector cell 4 must therefore produce a phase-shift of $\Delta\Phi$ in the corresponding signal so that the output signal of the phase comparator 7 is directly proportional in duration or amplitude to the focussing error $\epsilon$ in accordance with the characteristic (S) shown in broken line in FIG. 4.

In practice, the circuit 6 can be constituted by a monostable trigger stage which makes it possible to delay the signal which is to undergo phase-shift. This delay is chosen so that at the mean carrier frequency $\omega$, the delay produced corresponds to $\Delta\Phi$; since the phase modulation percentage produces only a small frequency excursion and the output signal from the comparator is filtered by the low-pass filter 8, a mean correction is sufficient to ensure the control of the position of the read-out spot in accordance with the output signal ($\epsilon$) from the filter 8.

Figure 9:
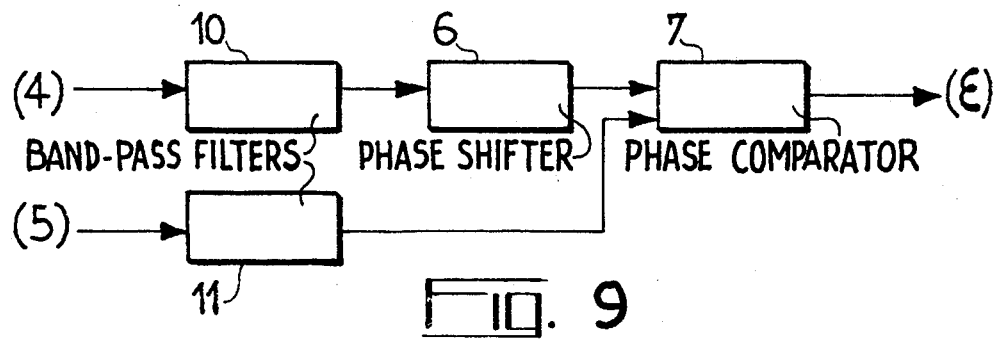
FIG. 9 illustrates a second embodiment of the error detection device.

Another embodiment of the device for detecting focussing error is shown in FIG. 9 where elements which are the same as those shown in FIG. 1, have been marked by the same references. The inputs (4) and (5) of said circuit are the outputs of the photodetectors 4 and 5. A band-pass filter 10 is connected to the input (4) and the band-pass filter 11 to the input (5). These filters are centred on a sub-carrier (or an auxiliary carrier) of the information signal. Phase comparison is carried out by the comparator 7 which compares the phase of the output signal from the filter 11 and that of the output signal from the phase-shifter 6 which is connected to the output of the filter 10.

Phase comparison between two signals at the frequency of a sub-carrier, makes it possible to improve the dynamic control range, a variation in phase of $\Delta\phi$ corresponding to a focussing error $\epsilon$ which is greater when the frequency is reduced.

Figure 10:
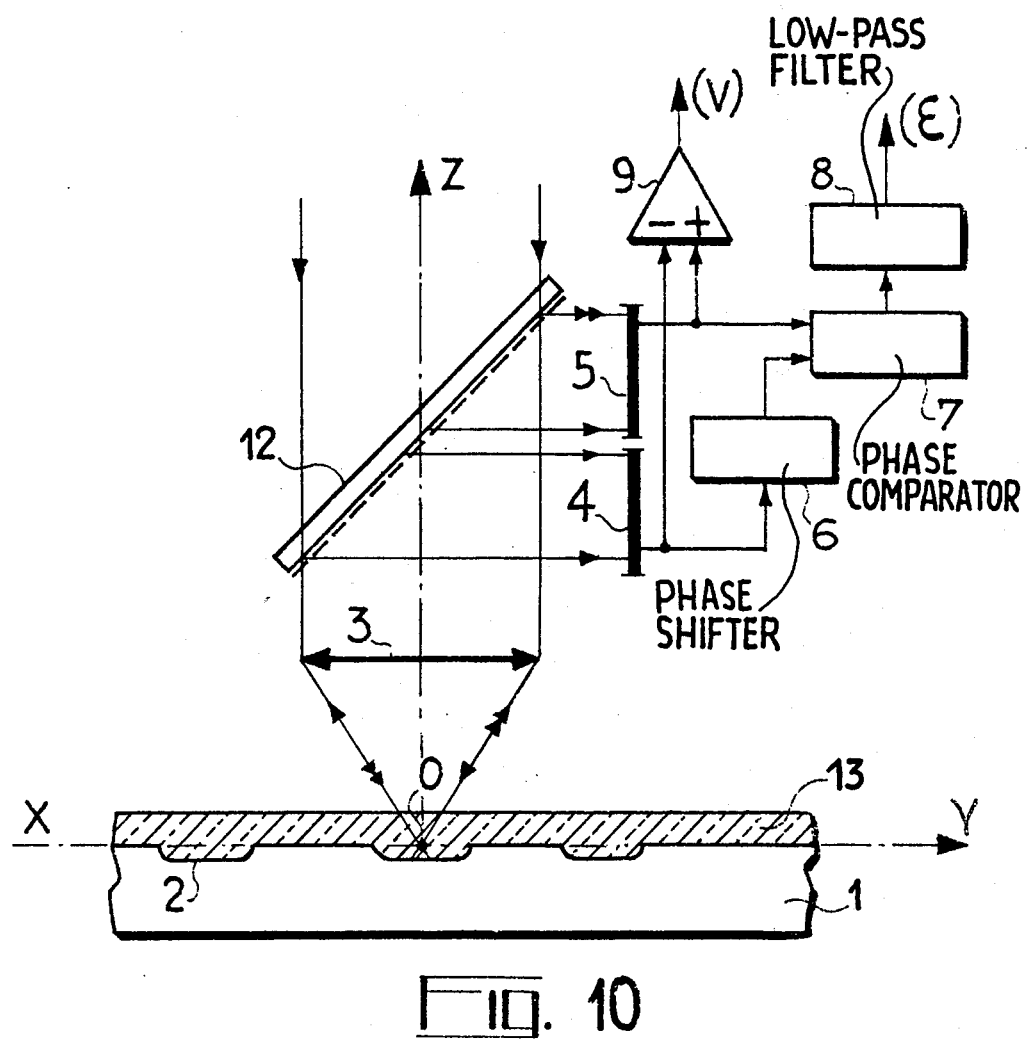
FIG. 10 illustrates an embodiment of the invention in which read-out is effected by reflection.

Another embodiment of the device has been shown in FIG. 10.

This comprises the same elements as the focussing error detection device shown in FIG. 1 but the reader head is designed for read-out by reflection.

To this end, a semi-transparent plate 12 is arranged between the radiation source producing the read-out beam, and the lens 3 which focuses the beam. The inclination of the semi-transparent plate is 45° in this device illustrated so that the photodetector cells are arranged perpendicularly to the direction of transfer of the data carrier.

Moreover, a transparent protective layer 13 has been shown at the read-out surface of the data carrier 1. This protective layer, which could have been illustrated in FIG. 1, introduces no modifications to the operation of the device because its depth is so much greater than that of the impression and any imperfections which its surface may contain remain undetected by the read-out beam.

The circuits producing the read-out signal and the focussing error signal, are identical to those shown in FIG. 1.

The invention is not limited to the embodiments described hereinbefore. In particular, the signals appearing on the transducers are alternating signals so that the dynamic range of the system is limited by the spatial periodicity of the signals on the photodetectors relative to their dimensions.

To increase this dynamic range, a simple device is to equip the photodetectors with additional slots or cells of small size. The signals appearing at the outputs of these cells have low amplitudes but vary slowly as a function of the focussing error. It is thus possible in a simple way to improve the dynamic range of the focussing control device.

Moreover, the delay device which does duty as a phase-shift element, may, assuming that the frequency variations are small, be replaced by two devices respectively in the output channels of the transducers 4 and 5, the phase-shift introduced between the two channels by these two devices having the value $\Delta\phi$ of the residual phase-shift.

We claim:

1. A focussing error detection device for detecting the focussing error in an optical reader head designed to read-out a diffractive track recorded on a moving data carrier, said reader head comprising a radiation source and an optical device for projecting a read-out spot onto said track, said detection device comprising means for detecting the emergent radiation emerging from said track which comprises at least two photodetector cells having respective outputs for delivering output signals, said cells being located in a plane perpendicular to the optical axis of said emergent radiation aligned along the projection of said track onto said plane and disposed symmetrically in relation to said optical axis and further means for measuring the time-shift between said output signals of said cells having two inputs coupled to said outputs of the cells by a coupling device, said further means having an output delivering a control signal characteristic of said focussing error.

2. A focussing error detection device as claimed in claim 1, wherein said diffractive track is a phase object and wherein said coupling device enable the two said output signals from the cells to be placed in a time-coincidental relationship for a situation of zero focussing error.

3. A focussing error detection device as claimed in claim 2, wherein said coupling device is adapted for deriving, from said output signals, substantially sinusoidal signals and wherein said further means is a phase comparator.

4. A focussing error detection device as claimed in claim 3, wherein said coupling device comprises phase shifting means having an input connected to the output of one of said cells and an output connected to one of the inputs of said comparator.

5. A focussing error detection device as claimed in claim 1, wherein said photodetector cells are read-out cells, the difference between the output signals from said cells being characteristic of the shape of said diffractive track.

6. A focussing error detection device as claimed in claim 1, wherein said radiation is transmitted by said data carrier to said photodetector cells.

7. A focussing error detection device as claimed in claim 1, wherein said radiation is reflected by said data carrier towards said photodetector cells.

* * * * *